US006323281B1

(12) United States Patent
Yang et al.

(10) Patent No.: US 6,323,281 B1
(45) Date of Patent: Nov. 27, 2001

(54) MISCIBLE BLENDS OF EPOXY-EXTENDED POLYETHERESTER RESINS AND COMMERCIAL POLYMER RESINS

(75) Inventors: Lau S. Yang, Wilmington, DE (US); Gangfeng Cai, West Chester, PA (US); Jeffrey M. McFarland, Brookhaven, PA (US); Jeffrey A. Klang, Exton, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 08/685,365

(22) Filed: Jul. 23, 1996

(51) Int. Cl.[7] ........................................... C08L 67/02
(52) U.S. Cl. ...................... 525/165; 525/438; 525/445; 525/531
(58) Field of Search .................................. 525/165, 438, 525/445, 531

(56) References Cited

U.S. PATENT DOCUMENTS

| 4,129,488 | * | 12/1978 | McGinnis | 204/159.19 |
| 4,336,344 | * | 6/1982 | Craigie | 525/531 |
| 5,145,883 | * | 9/1992 | Saito et al. | 521/172 |
| 5,196,482 | * | 3/1993 | Stahl et al. | 525/167 |
| 5,254,642 | * | 10/1993 | Chang et al. | 525/438 |
| 5,319,006 | * | 6/1994 | Yang et al. | 523/500 |
| 5,436,313 | * | 7/1995 | Yang et al. | 528/274 |
| 5,436,314 | * | 7/1995 | Yang et al. | 528/274 |

FOREIGN PATENT DOCUMENTS

580114 * 1/1994 (EP) .

* cited by examiner

Primary Examiner—Randy Gulakowski
(74) Attorney, Agent, or Firm—Jonathan L. Schuchardt

(57) ABSTRACT

Miscible blends of epoxy-extended polyetherester resins and commercial polymer resins are disclosed. Thermosets from the resin blends offer high-performance physical properties at a reduced cost compared with that of commercial high-performance resins. The thermosets have improved physical properties, including excellent water resistance, compared with many commercial systems. Resin blends of the invention are readily thickened, and are thus useful for SMC applications.

12 Claims, No Drawings

MISCIBLE BLENDS OF EPOXY-EXTENDED POLYETHERESTER RESINS AND COMMERCIAL POLYMER RESINS

FIELD OF THE INVENTION

The invention relates to miscible polymer blends. In particular, the invention relates to blends of epoxy-extended polyetherester resins and commercial polymer resins used in the unsaturated polyester resin industry. The invention provides high-performance thermosets at a reduced cost compared with commercially available high-performance systems.

BACKGROUND OF THE INVENTION

Recently, we described new processes for making polyetherester resins from polyethers (see U.S. Pat. Nos. 5,319,006, 5,436,313, and 5,436,314, and U.S. application Ser. No. 08/619,059, filed Mar. 20, 1996). In each process, a polyether reacts with a cyclic anhydride, a dicarboxylic acid, or a diol diester in the presence of an "insertion" catalyst. The anhydride, dicarboxylic acid, or diol diester inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset. Lewis acids, protic acids having a pKa less than about 0, and metal salts thereof are effective insertion catalysts. The insertion process provides a valuable and versatile way to make a many unique polyetherester intermediates.

More recently (see application Ser. No. 08/608,379, filed Feb. 28, 1996), we extended the insertion technology by developing a process for making high-performance polyetherester resins. These high-performance resins are made by chain extending a polyetherester resin (made by insertion) with a primary diol or a diepoxy compound. The high-performance resins give thermosets with improved high-temperature performance, better tensile and flex properties, and enhanced resistance to aqueous solutions—particularly aqueous acid and caustic solutions—compared with those made using the earlier polyetherester resins.

The polyester industry recognizes the problem of poor water resistance and inadequate tensile and flex properties of many commercial general-purpose polyester systems. In response, the industry has developed two classes of high-performance resins: isophthalate resins (hereinafter also called "iso resins") and vinyl esters. "Iso resins," which incorporate recurring units of isophthalic acid, give thermosets with better corrosion resistance compared with those made using general-purpose polyester resins. Because isophthalic acid is relatively expensive, however, and because processing can be time-consuming, iso resins provide better water resistance at a price. In addition, iso resins are still quite susceptible to degradation by aqueous caustic solutions.

Vinyl ester resins currently provide the highest level of physical properties available in the unsaturated polyester industry. When performance must be excellent, and low cost is not so important, vinyl esters are often used. Vinyl esters give thermosets with an excellent overall balance of properties, including high tensile and flex strengths and excellent corrosion resistance. Unfortunately, vinyl esters are by far the most expensive resins. In addition, vinyl ester resins are not easily thickened, and this limits their usefulness in SMC applications.

Another problem with the more expensive varieties of resins now available is that they are often incompatible with less expensive resins. For example, vinyl ester resins are not generally compatible with general-purpose resins. Thus, blending offers no value to a formulator who might wish to boost physical properties of a general-purpose resin by blending in vinyl ester, or to cheapen a vinyl ester formulation by adding some general-purpose resin.

Resin blends that can improve thermoset properties and/or reduce costs are needed. The excellent physical properties, low cost, and unique structure of epoxy-extended polyetherester resins prompted us to investigate blends of these resins with commercial polyester resins.

SUMMARY OF THE INVENTION

The invention is a miscible resin blend. The blend comprises an epoxy-extended polyetherester resin and one or more polymer resins selected from vinyl esters, isophthalate resins, orthophthalate resins, dicyclopentadiene (DCPD) resins, bisphenol A resins, propylene glycol-maleate resins (PG-maleate resins), and chlorendic anhydride resins.

Preferably, the epoxy-extended polyetherester resin is made by (1) reacting a polyether polyol with a dicarboxylic acid, an anhydride, or a diol diester in the presence of an insertion catalyst to produce an acid-terminated polyetherester resin; and (2) reacting the acid-terminated polyetherester resin with an epoxy compound to produce the epoxy-extended polyetherester resin.

We surprisingly found that epoxy-extended polyetherester resins have excellent compatibility with a wide range of commercial polyesters. Blends of epoxy-extended polyetherester resins and vinyl ester resins are miscible and give thermosets with excellent properties at a reduced cost compared with vinyl ester systems. In addition, these resin blends can be thickened easily, and are therefore useful in SMC applications. Iso resin blends with the epoxy-extended polyetherester resins are also miscible, and give excellent thermosets with dramatically improved KOH resistance compared with that of iso systems. In sum, the unusual compatibility of epoxy-extended polyetherester resins with a wide variety of commercial polyester resins makes them versatile blending resins for reducing costs and/or improving thermoset properties.

DETAILED DESCRIPTION OF THE INVENTION

The miscible resin blends of the invention comprise an epoxy-extended polyetherester resin and one or more polymer resins selected from the group consisting of vinyl esters, isophthalate resins, orthophthalate resins, dicyclopentadiene (DCPD) resins, bisphenol A resins, PG-maleate resins, and chlorendic anhydride resins.

Epoxy-extended polyetherester resins are reaction products of a polyetherester resin and an epoxy compound, preferably a diepoxy compound. The epoxy compound links polyetherester chains by reacting with carboxylic acid end groups of the polyetherester resin.

Preferably, the epoxy-extended polyetherester resin is prepared in two steps. First, a polyether polyol reacts with a dicarboxylic acid, an anhydride, or a diol diester in the presence of an insertion catalyst to produce an acid-terminated polyetherester resin. Second, the acid-terminated polyetherester resin reacts with an epoxy compound to produce the epoxy-extended polyetherester resin.

Polyether polyols suitable for use in this first step are those derived from ring-opening polymerization of cyclic ethers such as epoxides, oxetanes, oxolanes, and the like, and mixtures thereof. The polyols have oxyalkylene repeat units (—O—A—) in which A has from 2 to 10 carbon atoms, preferably from 2 to 4 carbon atoms. Suitable polyether polyols include, for example, polyoxypropylene polyols, polyoxyethylene polyols, ethylene oxide-propylene oxide copolymers, polytetramethylene ether glycols, and the like, and mixtures thereof. Typically, the polyols have average hydroxyl functionalities from about 2 to about 8, and number average molecular weights from about 250 to about 25,000. Preferred polyether polyols have an average hydroxyl functionality within the range of about 2 to about 6, a hydroxyl number within the range of about 28 to about 260 mg KOH/g, and a number average molecular weight within the range of about 400 to about 12,000. Particularly preferred are polyoxypropylene diols and triols having a number average molecular weight within the range of about 1000 to about 4000. Other examples of suitable polyols appear in U.S. Pat. No. 5,319,006, the teachings of which are incorporated herein by reference.

Anhydrides useful in the process are cyclic anhydrides, which may be saturated or unsaturated. "Cyclic" anhydrides contain the anhydride functionality within a ring. Examples include phthalic anhydride and maleic anhydride. "Saturated" anhydrides contain no ethylenic unsaturation, but may contain aromatic rings. Examples include phthalic anhydride, propionic anhydride, trimellitic anhydride, and succinic anhydride. "Unsaturated" anhydrides contain ethylenic unsaturation that becomes incorporated into the polyetherester resin. Maleic anhydride is an example. Other examples of suitable anhydrides appear in U.S. Pat. No. 5,436,313, the teachings of which are incorporated herein by reference.

Dicarboxylic acids useful in the process are saturated or unsaturated. Preferred dicarboxylic acids are linear, branched, or cyclic $C_3$–$C_{40}$ aliphatic dicarboxylic acids and $C_8$–$C_{40}$ aromatic dicarboxylic acids. Examples include adipic acid, maleic acid, succinic acid, isophthalic acid, and the like, and mixtures thereof. Additional examples of suitable dicarboxylic acids appear in U.S. Pat. No. 5,436,314, the teachings of which are incorporated herein by reference.

Diol diesters are reaction products of about 2 moles of a cyclic anhydride with about 1 mole of a diol. The diol diesters have two internal ester units, and two carboxylic acid end groups that result from ring opening of the cyclic anhydride. Suitable diol diesters can be made in other ways well known to those skilled in the art. For example, the diol can be esterified with a dicarboxylic acid or reacted with an acid halide. However, the anhydride route is most convenient.

Preferred diol diesters have the general formula:

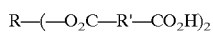

in which R is a bivalent $C_2$–$C_{30}$ alkyl or aralkyl moiety derived from a diol, and R' is a bivalent $C_2$–$C_{20}$ alkyl or aryl moiety derived from a cyclic anhydride. Suitable diol diesters derive from $C_2$–$C_{30}$ diols, including, for example, ethylene glycol, propylene glycol, diethylene glycol, dipropylene glycol, triethylene glycol, tripropylene glycol, 2-methyl-1,3-propanediol, neopentyl glycol, 1,4-butanediol, 1,6-hexanediol, 1,4-benzenedimethanol, 1,4-cyclohexanedimethanol, bisphenol A, bisphenol F, alkoxylated bisphenols, and the like, and mixtures thereof. Suitable cyclic anhydrides from which the diol diesters derive are saturated or unsaturated $C_4$–$C_{20}$ cyclic anhydrides. Examples include maleic anhydride, phthalic anhydride, succinic anhydride, itaconic anhydride, citraconic anhydride, trimellitic anhydride, and the like, and mixtures thereof.

The first step is performed in the presence of an insertion catalyst. By "insertion catalyst" we mean a catalyst that promotes random insertion of anhydrides, dicarboxylic acids, or diol diesters into carbon-oxygen bonds of a polyether polyol to produce a polyetherester. Suitable insertion catalysts have been previously described. They include Lewis acids (see U.S. Pat. No. 5,319,006 for a general description and examples), protic acids that have a pKa less than about 0 (see U.S. Pat. No. 5,436,313 for examples), and metal salts of these protic acids (see U.S. Pat. No. 5,436,313). Organic sulfonic acids such as p-toluenesulfonic acid are particularly preferred insertion catalysts.

The process used to make the acid-terminated polyetherester resin involves heating a polyether polyol and dicarboxylic acid, anhydride, or diol diester in the presence of an insertion catalyst generally as is taught in U.S. Pat. Nos. 5,319,006, 5,436,313, and 5,436,314, and in application Ser. No. 08/619,059. Unlike unsaturated polyesters, this acid-terminated polyetherester resin contains primarily carboxylic acid end groups; the resin is essentially free of hydroxyl end groups. The acid number is typically within the range of about 40 to about 200 mg KOH/g. A more preferred range is from about 60 to about 180 mg KOH/g.

The acid-terminated polyetherester resin will preferably have recurring polyether blocks that have, on average, from about 3 to about 6 oxyalkylene (e.g., oxypropylene, oxyethylene) units. Generally, the resin has an ether/ester mole ratio of at least about 0.75. Preferred acid-terminated polyetherester resins have ether/ester ratios within the range of about 1 to about 3. The resins generally have number average molecular weights within the range of about 500 to about 10,000.

In the second step, the acid-terminated polyetherester resin reacts with an epoxy compound to produce an epoxy-extended polyetherester resin. Preferred epoxy compounds have two epoxy groups available for reaction with the carboxylic acid groups of the acid-terminated polyetherester resin. Epoxy resins, such as bisphenol A diglycidyl ether, are preferred epoxy compounds. Suitable epoxy resins include Shell Chemical's "EPON" resins such as EPON 828 resin, and Dow Chemical's "D.E.R." resins, such as D.E.R. 330 and D.E.R. 331 resins. Other suitable epoxy compounds include novolak resins (phenol/formaldehyde condensation products), brominated epoxy resins, aliphatic diepoxy compounds (e.g., diepoxides derived from 1,3butadiene or cyclopentadiene), advanced epoxies (high molecular weight diepoxy compounds), ether-containing diepoxy compounds (diepoxide from diallyl ether, diglycidyl ethers of polyoxypropylene diols such as D.E.R. 732 resin), epoxidized fatty acids, and the like, and mixtures thereof.

The amount of epoxy compound used is not particularly critical. Generally, the amount used depends on the nature of the acid-terminated polyetherester, the type of epoxy compound, the desired properties of the chain-extended polyetherester resin, the ultimate thermoset properties sought, and other factors. Usually, at least about 1 wt. % of epoxy compound is used based on the amount of acid-terminated polyetherester resin. Preferably, the epoxy compound is used in an amount within the range of about 5 to about 60 wt. %, more preferably from about 10 to about 40 wt. %, based on the amount of acid-terminated polyetherester resin. The epoxy-extended polyetherester resins generally have much broader molecular weight distributions compared with the acid-terminated polyetheresters from which they are made; the Mw/Mn ratios are typically greater than about 8, and can be as high as 30 or more.

The epoxy-extended polyetherester resins have reduced acid numbers compared with the acid-terminated polyetherester resins from which they derive. The chain-extended polyetherester resins typically have acid numbers less than about 80 mg KOH/g, preferably less than about 60 mg KOH/g. Blends of these resins with polymer resins are valuable for making polyetherester thermosets.

In addition to the epoxy-extended polyetherester resin, the miscible resin blends of the invention include a polymer resin. Suitable polymer resins include vinyl esters, isophthalate resins, orthophthalate resins, dicyclopentadiene (DCPD) resins, bisphenol A resins, propylene glycol-maleate (PG-maleate) resins, and chlorendic anhydride resins. Many of these resins are commercially available. For example, DERAKANE 411 resin is a vinyl ester resin available from Dow Chemical, and E-701 resin is an iso resin available from AOC.

The relative amounts of epoxy-extended polyetherester resin and polymer resin in the miscible resin blends of the invention can vary within wide limits, and depends on many factors, including the nature of the epoxy-extended polyetherester resin, the type of polymer resin used, the desired physical properties of the thermoset, the amount of vinyl monomer used, and other factors. Generally, however, it is preferred that the miscible resin blend comprise from about 5 to about 95 wt. % of the epoxy-extended polyetherester resin; a more preferred range is from about 25 to about 75 wt. %.

The miscible blends are made by any convenient means. Usually, the epoxy-extended polyetherester resin and polymer resin are simply blended together until a homogeneous mixture results. Blending is preferably performed at room temperature, although higher temperatures (up to about 100° C.) can be used if desired.

The miscible resin blends of the invention are useful for making high-performance thermosets. The resin blend reacts with a vinyl monomer in the presence of a free-radical initiator to give the cured polyetherester thermoset. Examples 2–11 show how to make cured polyetherester thermosets from miscible resin blends of the invention.

Vinyl monomers useful in making the thermosets include, for example, vinyl aromatic monomers, vinyl esters of carboxylic acids, acrylic and methacrylic esters, acrylamides and methacrylamides, acrylonitrile and methacrylonitrile, alkyl vinyl ethers, allyl esters of aromatic di- and polyacids, and the like, and mixtures thereof. Preferred vinyl monomers are vinyl aromatic monomers, methacrylic acid esters, and diallyl esters of aromatic di- and polyacids. Particularly preferred vinyl monomers are styrene, vinyl toluene, methyl methacrylate, and diallyl phthalate.

The amount of vinyl monomer used depends on several factors, including the nature and relative amounts of the epoxy-extended polyetherester resin and polymer resin, the desired thermoset physical properties, the particular vinyl monomer used, and other factors. Generally, the amount used will be within the range of about 10 to about 70 wt. % based on the amount of cured polyetherester thermoset; a more preferred range is from about 20 to about 65 wt. %.

Free-radical initiators useful in the invention are any of the peroxide and azo-type initiators that are well known in the art for curing conventional unsaturated polyester resins. Peroxide initiators are preferred. Suitable examples include benzoyl peroxide, methyl ethyl ketone peroxide, tert-butylperbenzoate, AIBN, and the like. The amount of free-radical initiator used will typically be within the range of about 0.1 to about 5 wt. % based on the weight of cured polyetherester thermoset.

Fillers, glass fibers, pigments, thickening agents (e.g., metal oxides) or other additives may be included in the miscible blends and polyetherester thermosets of the invention. Suitable fillers include, for example, talc, calcium oxide, calcium carbonate, aluminum trihydrate, magnesium silicate, alumina, carbon, clays, diatomaceous earth, and the like. Glass powder, spheres, fibers, or chopped glass of any size or shape can be used to reinforce the polyetherester thermoset.

The polyetherester thermosets are made by reacting the miscible resin blends, vinyl monomer, and free-radical initiator according to methods well known in the art of making thermosets from unsaturated polyester resins (see Examples 2–11). Typically, a resin mixture that contains vinyl monomer is combined with the free-radical initiator at room or elevated temperature, and is cured to give a solid product that may be post-cured if desired by heating at elevated temperature.

An advantage of the resin blends of the invention is that they can be easily thickened. As Example 12 shows, a blend of an epoxy-extended polyetherester resin and a vinyl ester resin thickens much more effectively than a vinyl ester resin alone. Consequently, the epoxy-extended polyetherester resin/vinyl ester resin blend is useful for end-use applications that require a thickenable resin composition, such as SMC applications.

The following examples merely illustrate the invention. Those skilled in the art will recognize many variations that are within the spirit of the invention and scope of the claims.

EXAMPLE 1

Preparation of an Epoxy-Extended Polyetherester Resin

A twelve-liter reactor equipped with mechanical stirrer, thermocouple, nitrogen sparger, and overhead condenser is charged with a 2000 mol. wt. polyoxypropylene diol (5440 g) and maleic anhydride (2560 g). The mixture is heated to 60–80° C. to melt the anhydride. A solution of p-toluenesulfonic acid (6.0 g) in water (470 g) is added. The mixture is heated to 190° C. over 2 h. The mixture is heated for 12–14 h at 190° C., and the acid number drops to 90–105 mg KOH/g. This intermediate is an acid-terminated polyetherester resin. The mixture is cooled to 160° C.

EPON 828 epoxy resin (15–25 wt. %, product of Shell Chemical) that has been preheated to 100° C. is added, and the mixture is heated at 150° C. for 2 to 5 h until the acid number drops to 35–50 mg KOH/g. Hydroquinone (0.70 g) is added, and the mixture is stirred for at least 10 min. The resulting chain-extended polyetherester resin is cooled to 110–120° C., blended with styrene (65% resin) containing t-butylcatechol (142 ppm) and methyl-t-butylhydroquinone (430 ppm), and is cooled quickly to room temperature.

EXAMPLES 2–6

Thermosets from Vinyl Ester/Epoxy-Extended Polyetherester Resin Blends

Thermosets are made from the epoxy-extended polyetherester resin of Example 1, DERAKANE 411 vinyl ester resin (product of Dow Chemical), and blends of the two resins. The epoxy-extended polyetherester resin and vinyl ester resin are completely miscible. The resin or blend of resins is diluted to 50 wt. % styrene. The mixtures are cured using 0.12 wt. % of cobalt naphthenate solution (6% Co naphthenate in mineral spirits) and 1.2 wt. % of LUPERSOL DDM9 initiator (methyl ethyl ketone peroxide, product of Atochem) at room temperature overnight, followed by a post-cure at 100° C. for 5 h. Properties of the cured thermosets appear in Table 1.

The results in Table 1 show that both the epoxy-extended polyetherester resin and the vinyl ester resin give thermosets with excellent tensile and flex properties and excellent corrosion resistance when used alone. While one might expect the thermosets from blends to lose properties, the results show that blending hurts neither tensile/flex properties nor corrosion resistance.

EXAMPLES 7–11

Thermosets from Iso Resin/Epoxy-Extended Polyetherester Resin Blends

Thermosets are made from the epoxy-extended polyetherester resin of Example 1, E-701 iso resin (product of AOC), and blends of the two resins. The epoxy-extended polyetherester resin and the iso resin are completely miscible. The resin or blend of resins is diluted to 50 wt. % styrene. The mixtures are cured using 0.3 wt. % of cobalt naphthenate solution (6% Co naphthenate in mineral spirits) and 1.5 wt. % of LUPERSOL DDM9 initiator (methyl ethyl ketone peroxide, product of Atochem) at room temperature overnight, followed by a post-cure at 100° C. for 5 h. Properties of the cured thermosets appear in Table 2.

The results in Table 2 show significant synergy in thermosets made from blends of epoxy-extended polyetherester resins and iso resins. Thermosets made from blends of these resins generally exhibit better physical properties than thermosets made from either resin alone. For example, a 50/50 blend of epoxy-extended polyetherester resin and iso resin gives a thermoset with improved tensile strength, water resistance, acid resistance, and base resistance compared with one made from either resin alone. Particularly remarkable is the 50/50 blend, which retains 95% of its flex strength after 6 days in boiling 5% aqueous KOH, compared with 49% retention for the thermoset made from iso resin only. The 50/50 blend of epoxy-extended polyetherester resin and iso resin also has properties that rival those from the more-expensive vinyl ester resin. With the exception of tensile elongation, thermoset properties from the 50/50 blend are at least 95% of those available from the vinyl ester system.

EXAMPLE 12

Preparation of a Thickened Resin for SMC Applications

A blend of the epoxy-extended polyetherester resin of Example 1 (75 g) and DERAKANE 411 vinyl ester resin (25 g) is combined with calcium carbonate (150 g) and magnesium oxide paste (50% active, 0.6 g). The mixture has an initial viscosity of 2500 cps, a one-hour viscosity of 1,000,000 cps, and a one-day viscosity of 7,000,000 cps.

In one comparison, DERAKANE 411 vinyl ester resin (100 g) is combined with calcium carbonate (150 g) and magnesium oxide paste (50% active, 2.0 g). This mixture has an initial viscosity of 2500 cps, a one-hour viscosity of 50,000 cps, and a one-day viscosity of 80,000 cps.

In another comparison, a polyetherester resin made by insertion as described in U.S. Pat. No. 5,436,314 (35 wt. % of recurring units from maleic anhydride; not epoxy-extended) is used instead of the epoxy-extended polyetherester resin. This resin (75 g) and DERAKANE 411 vinyl ester resin (25 g) are combined with calcium carbonate (150 g) and magnesium oxide paste (50% active, 0.6 g). The mixture produces a lumpy slurry that is not suitable for use in an SMC application.

These results show that blending in an epoxy-extended polyetherester resin with a vinyl ester resin produces an easily thickened resin mixture that is well-suited for use in SMC applications compared with vinyl ester resin systems alone or vinyl ester resin blends with polyetherester resins that are not epoxy-extended.

The preceding examples are meant only as illustrations; the following claims define the scope of the invention.

TABLE 1

Thermosets from Epoxy-Extended Polyetherester Resin/Vinyl Ester Resin Blends

| Ex. # | Wt. % epoxy-extended polyetherester resin in blend | Tensile Str. (psi) | Elong. (%) | Flex. Str. (kpsi) | % Flex. Str. Retention (6-h boil) water | HCl | KOH |
|---|---|---|---|---|---|---|---|
| C2 | 100 | 10400 | 4.5 | 18.3 | 96 | 88 | 96 |
| 3 | 75 | 11300 | 4.7 | 18.9 | 92 | 95 | 93 |
| 4 | 50 | 11700 | 5.5 | 20.0 | 94 | 95 | 94 |
| 5 | 25 | 12100 | 6.0 | 20.4 | 100 | 95 | 100 |
| C6 | 0 | 12000 | 6.1 | 20.8 | 96 | 99 | 98 |

TABLE 2

Thermosets from Epoxy-Extended Polyetherester Resin/Iso Resin Blends

| Ex. # | Wt. % epoxy-extended polyetherester resin in blend | Tensile Str. (psi) | Elong. (%) | Flex. Str. (kpsi) | % Flex. Str. Retention (6-h boil) water | HCl | KOH |
|---|---|---|---|---|---|---|---|
| C7 | 100 | 9600 | 4.6 | 18.8 | 91 | 93 | 91 |
| 8 | 75 | 11000 | 4.3 | 20.3 | 93 | 95 | 96 |
| 9 | 50 | 11700 | 4.6 | 20.5 | 99 | 97 | 95 |
| 10 | 25 | 12700 | 3.7 | 23.1 | 90 | 82 | 40 |
| C11 | 0 | 10100 | 2.1 | 22.6 | 78 | 78 | 49 |

We claim:

1. A composition comprising a miscible resin blend of:
   (a) an epoxy-extended polyetherester resin prepared by
      (1) reacting a polyether polyol with a dicarboxylic acid, an anhydride, or a diol diester in the presence of an insertion catalyst to produce an acid-terminated polyetherester resin; and
      (2) reacting the acid-terminated polyetherester resin with an epoxy compound to produce the epoxy-extended polyetherester resin; and
   (b) one or more polymer resins selected from the group consisting of vinyl esters, isophthalate resins, orthophthalate resins, dicyclopentadiene (DCPD) resins, bisphenol A resins, propylene glycol-maleate resins, and chlorendic anhydride resins.

2. The composition of claim 1 comprising from about 5 to about 95 wt. % of the epoxy-extended polyetherester resin.

3. The composition of claim 1 wherein the polyether polyol has an average hydroxyl functionality within the range of about 2 to about 6, a hydroxyl number within the range of about 28 to about 260 mg KOH/g, and a number average molecular weight within the range of about 400 to about 12,000.

4. The composition of claim 1 further comprising one or more additives selected from the group consisting of fillers, glass, pigments, and thickening agents.

5. A polyetherester thermoset which comprises the reaction product of the miscible resin blend of claim 1, a vinyl monomer, and a free-radical initiator.

6. A composition comprising a miscible resin blend of:
   (a) from about 5 to about 95 wt. % of an epoxy-extended polyetherester resin prepared by
      (1) reacting a polyether polyol with a dicarboxylic acid, an anhydride, or a diol diester in the presence of an insertion catalyst to produce an acid-terminated polyetherester resin; and
      (2) reacting the acid-terminated polyetherester resin with an epoxy compound to produce the epoxy-extended polyetherester resin; and
   (b) from about 5 to about 95 wt. % of a vinyl ester resin.

7. The composition of claim 6 further comprising one or more additives selected from the group consisting of fillers, glass, pigments, and thickening agents.

8. A polyetherester thermoset which comprises the reaction product of the miscible resin blend of claim 6, a vinyl monomer, and a free-radical initiator.

9. A composition comprising a miscible resin blend of:
   (a) from about 5 to about 95 wt. % of an epoxy-extended polyetherester resin prepared by
      (1) reacting a polyether polyol with a dicarboxylic acid, an anhydride, or a diol diester in the presence of an insertion catalyst to produce an acid-terminated polyetherester resin; and
      (2) reacting the acid-terminated polyetherester resin with an epoxy compound to produce the epoxy-extended polyetherester resin; and
   (b) from about 5 to about 95 wt. % of an isophthalate resin.

10. The composition of claim 9 comprising from about 25 to about 75 wt. % of the epoxy-extended polyetherester resin.

11. The composition of claim 9 further comprising one or more additives selected from the group consisting of fillers, glass, pigments, and thickening agents.

12. A polyetherester thermoset which comprises the reaction product of the miscible resin blend of claim 9, a vinyl monomer, and a free-radical initiator.

* * * * *

UNITED STATES PATENT AND TRADEMARK OFFICE
CERTIFICATE OF CORRECTION

PATENT NO.    : 6,323,281 B1
DATED         : November 27, 2001
INVENTOR(S)   : Yang et al.

Page 1 of 1

It is certified that error appears in the above-identified patent and that said Letters Patent is hereby corrected as shown below:

<u>Title page,</u>
Insert -- [*] Notice:  Under 35 U.S.C. 154(b), the term of this patent shall be extended for 722 days. --.

Signed and Sealed this

Third Day of December, 2002

JAMES E. ROGAN
*Director of the United States Patent and Trademark Office*